Patented May 24, 1927.

1,629,854

UNITED STATES PATENT OFFICE.

HENRY L. BATES, OF GREENFIELD, MASSACHUSETTS.

ARTIFICIAL MARBLE.

No Drawing. Application filed September 4, 1926. Serial No. 133,730.

This invention relates to improvements in the manufacture of artificial marble and the like, as brick, stone, or tiling having the appearance of natural marble or onyx.

The object of my invention is in the production of a marble like substance which is used for building purposes, preferably for interior work, also in place of slate for roofing material. The composition of matter possesses the properties of lightness, and capable of being readily molded. It hardens without the application of heat. In practice it has been found that the hardening is completed within seven or eight hours. It is also non-combustible.

The appearance of the finished surface as it leaves the mold is highly polished thus obviating the necessity of polishing the substance after it leaves the mold.

The composition consists of a mixture of calcine magnesite, powdered asbestos, powdered alum, hydrated lime, casein, powdered salt peter, powdered bonnet glue, sand, or ground stone for the base, and suitable mineral coloring matter.

In preparing the composition, the ingredients are used in substantially the following proportions: calcine magnesite, 5 pounds; powdered asbestos, 1 pound; powdered alum, 1 ounce; hydrated lime, 2 ounces; casein, 2 pounds; powdered salt peter, 1 ounce; and powdered glue 2 ounces together with a sufficient quantity of sand or ground stone to form a suitable paste.

The composition of matter is formed by first placing two ounces of the powdered glue in two quarts of water with sand or ground stone forming the base. The other ingredients are mixed in the proportions mentioned. The alum is for the purpose of imparting sufficient hardness to the composition of matter. The powdered asbestos imparts lightness and renders the composition fire proof and prevents brittleness and less liable to break. The hydrated lime possesses the property of hardening in the atmosphere. The sand or ground stone may be of different colors for changing the general appearance of the finished article. A mineral coloring matter is preferably employed. If desired, pieces of pearl, or thin substances may be molded in place.

The calcined magnesite ($MgCO_3$) is obviously reduced to $MgO$ and $CO_2$ gas which is liberated when it is burned. The function of the calcined magnesite is an inert substance and simply furnishes the greater or bulk portion of the composition. The function of the casein and glue is for the purpose of supplying a binding element.

It is understood that it is not necessary to follow the exact proportions of the various substances mentioned as they may be varied to suit different purposes.

The salt peter in the composition apparently adds to the highly artistic appearance of the product.

The composition is light, fire proof, attractive in appearance, impervious to water and in general appearance it very closely resembles natural marble or onyx.

What I claim is:

1. A plastic composition adapted to form an artificial marble like substance, comprising a powdered mineral material, asbestos, in a finely divided form, alum, hydrated lime together with a glue binding substance, a mineral coloring substance, the whole to be formed as a paste for molding.

2. A plastic composition adapted to form a marble like substance for building purposes and the like in the following proportions comprising calcine magnesite, five pounds; powdered asbestos, one pound, powdered alum, one ounce; hydrated lime, two ounces; casein, two pounds, powdered salt peter, one ounce; a glue solution, two quarts, and a base substance consisting of ground stone.

3. A plastic composition designed to be molded for forming an artificial marble like substance, comprising a base of sand, a hardening substance, a mineral like substance, hydrated lime, powdered asbestos, and a glue like substance.

4. A composition of matter for forming a marble like substance, comprising burned magnesite, a powdered non-combustible substance, of low specific gravity, a hardening substance, a hydrated lime, casein, salt peter in small quantities, an adhesive glue like substance, and a base of silica, the whole to be formed as a pasty mass for molding and which sets without the application of artificial heat.

5. A composition of matter for forming artificial marble, brick, tiling, or the like comprising a magnesite substance, asbestos, an alum hardening substance, slaked lime, casein, powdered salt peter, a glue binding material, water and sand to form a pasty mass of a consistency suitable for molding purposes.

HENRY L. BATES.